3,375,222
SOLID STATE STABILIZATION OF CRUDE ALKALI METAL POLYSTYRENE SULFONATES WITH WATER-SOLUBLE NITRITE

William E. Smith, Midland, and Henry Volk, Bay City, Mich., assignors to The Dow Chemical Company, Midland, Mich., a corporation of Delaware
No Drawing. Filed Aug. 26, 1964, Ser. No. 392,288
5 Claims. (Cl. 260—45.9)

The present invention relates to the stabilization, in terms of maintaining flocculation activity, of crude alkali metal polystyrene sulfonates obtained as products of a polymerization process hereinafter described.

It has been recently discovered that ultra-high molecular weight, alkali metal polystyrene sulfonates such as sodium polystyrene sulfonate can be prepared by simultaneously dehydrohalogenating $\beta$-bromoethylbenzene sulforic acid and polymerizing the resulting styrene sulfonate monomer in situ under an inert atmosphere. Illustratively, one part of $\beta$-bromoethylbenzene sulfonic acid is dissolved in from 4 to about 9 parts of water and the solution charged to a suitable enclosed reactor having means for agitating its contents. Air is removed from the reaction system by purging with inert gas such as nitrogen. An alkali metal hydroxide, such as caustic, is then charged to the reactor in an amount sufficient to neutralize the sulfonic acid groups and to react stoichiometrically with the $\beta$-bromoethyl groups and to provide an excess thereof sufficient to maintain the reaction system at a pH of at least about 11. The excess amount used should not exceed about 20 percent by weight of the charged $\beta$-bromoethylbenzene sulfonic acid. Thereafter, the temperature on the reaction system is increased to about 70° C. These reaction conditions are maintained until the desired degree of conversion of $\beta$-bromoethylbenzene sulfonate to polymer has been achieved. At least about 60 percent conversion is desirable.

The aqueous polymerizate, or polymer gel, thus prepared contains a high molecular weight, flocculation grade alkali metal polystyrene sulfonate. In addition, the crude polymerizate contains residual styrene sulfonate monomer, alkali metal bromide and excess alkali metal hydroxide. The polymerizate is dried at a moderate temperature to recover a highly useful, crude, solid polymer composition with the aforementioned impurities. The crude alkali metal polystyrene sulfonate composition prepared according to the foregoing procedure has excellent flocculation capabilities as received from the drier.

In comparison to the purified polymer, the crude polymer has excellent stability in aqueous solution. It was unexpectedly discovered, however, that the crude polymer was subject to serious degradation when stored before use as a solid composition in the presence of air. This is in contradistinction to the purified polymer which, in a comparative sense, retains most of its flocculation activity during storage in a solid state.

It has now been discovered that the crude alkali metal polystyrene sulfonate as described above is stabilized in the solid state by the addition thereto of from about 0.5 up to as much as about 30 percent by weight, based on the weight of the polymer of a water-soluble nitrite. Specific nitrites that can be employed include sodium nitrite, potassium nitrite, lithium nitrite, magnesium nitrite, calcium nitrite, barium nitrite, ammonium nitrite, and the like. In general, any water-soluble nitrite can be employed, but alkali metal nitrites are preferred.

To be effective, the nitrite must be uniformly incorporated into the crude polymer composition. This is accomplished by dissolving the nitrite in an aqueous solution of the crude polymer composition, such as the crude polymer gel obtained from the polymerization reaction. To efficiently dissolve the nitrite in such a polymer gel, it is desirable to utilize efficient mixing devices such as mixing mills, pumps, or mixing augers and, in general, any mechanical device which distributes the nitrite uniformly throughout the gel. Uniform mixing of the nitrite with the polymer gel is promoted by applying the nitrite to the gel in the form of an aqueous solution. After uniformly incorporating the nitrite into the gel, the water is evaporated from the gel. This is conveniently accomplished by applying the treated polymer gel to a heated surface such as a double drum drier. The dried nitrite treated crude polymer composition thus prepared is exceptionally stable in the dry state.

The following examples are illustrative specific embodiments of the invention. Comparative data also show the surprising uniqueness of the results obtained.

A polymer gel was prepared according to the procedure generally described above containing 10.2 weight percent of a flocculation grade, high molecular weight sodium polystyrene sulfonate, 5.9 weight percent residual sodium styrene sulfonate, 8.6 weight percent sodium bromide and less than about 1 weight percent of residual sodium hydroxide. Also present was a small amount of sodium sulfate (less than 1 weight percent) as the result of sulfuric acid being present in the $\beta$-bromobenzene sulfonic acid used in the polymerization.

This polymer gel was divided into aliquots of about 500 grams each. To three aliquots, hereinafter referred to as compositions "A," "B" and "C," respectively, were added amounts of sodium nitrite of 3, 10 and 16 percent by weight based on the polymer, respectively. The nitrite was thoroughly mixed with each gel. One aliquot was left untreated. The treated and untreated gel aliquots were then dried to recover solid polymer compositions.

A portion of each polymer composition was dissolved in water to provide a 0.025 percent by weight aqueous solution of the polymer. Dosages of 2.0, 2.5 and 3.0 milliliters of each polymer solution were mixed with 100 milliliter aliquots, contained in 100 milliliter graduated cylinders, of a clay suspension containing 10 grams of a finely divided bentonite clay and 2.4 grams of sodium hydroxide. After revolving the cylinder 3 times, the time in seconds for the clay suspension to settle from the 90 milliliter to the 60 milliliter mark on the cylinder was recorded. The test results are reported in the following table under the heading "Initial Activity Immediately After Drying."

Further portions of each polymer composition were heated in the solid state at 60° C. for 24 hours while air was blown over the surface of the compositions. The flocculation activities of the nitrite treated and untreated crude polymer compositions were determined according to the above procedure and are reported in the following table under the heading "Activity After Accelerated Storage in Solid State."

For the purposes of comparison, additional portions of the nitrite treated and untreated crude polymer compositions were stored in aqueous solutions containing 0.025 percent by weight of the polymer at 80° C. for 24 hours. After such treatment, which simulated storage in solution for many days, the polymer solutions were employed in the flocculation test as described above. This data is reported in the following table under the heading "Comparative Activity After Accelerated Storage in Solution."

In addition to the above data obtained using crude polymer, another portion of the above-described crude polymer gel was mixed with methanol to precipitate the active polymer. The precipitated polymer was recovered by filtration, dried and re-dissolved in water to provide a 2 percent by weight aqueous solution of purified polymer. This solution was then dried on the double drum drier and the purified solid polymer tested for its flocculation activity in the same manner as the above crude polymer compositions.

The table reports the flocculation times, in seconds, at three different dosages, for each of three nitrite treated polymer compositions, i.e., "A", "B" and "C" as well as comparative flocculations times for the untreated crude polymer and the untreated purified polymer.

TABLE

| | Test No. | Polymer Dose, ml. | Flocculation Time, sec. | | | | |
|---|---|---|---|---|---|---|---|
| | | | "A" 3% $NO_2$ | "B" 10% $NO_2$ | "C" 16% $NO_2$ | Untreated Crude Polymer | Untreated Purified Polymer |
| Initial Activity Immediately After Drying. | 1 | 2.0 | 6 | 6 | 12 | 6 | 17 |
| | 2 | 2.5 | 5 | 4 | 6 | 4 | 12 |
| | 3 | 3.0 | 3 | 3 | 4 | 3 | 9 |
| Activity After Accelerated Storage in Solid State. | 1 | 2.0 | 19 | 11 | 6 | ------ | 44 |
| | 2 | 2.5 | 10 | 8 | 4 | 92 | 26 |
| | 3 | 3.0 | 6 | 5 | 3 | 70 | 19 |
| Comparative Activity After Accelerated Storage in Solution. | 1 | 2.0 | 19 | 13 | 23 | 9 | 174 |
| | 2 | 2.5 | 13 | 10 | 9 | 8 | 177 |
| | 3 | 3.0 | 7 | 5 | 7 | ------ | 164 |

The above data illustrate the superior stabilization, i.e., retention of flocculation activity, achieved with nitrite treated crude sodium polystyrene sulfonate stored in the solid dry state. Surprisingly, the crude polymer without nitrite has excellent stability in aqueous solution. In fact, crude polymer containing nitrite, in solution storage, degraded significantly more than the crude polymer without any nitrite addition. Thus, the curious situation exists in which crude sodium polystyrene sulfonate is stabilized in the solid state by the presence of water-soluble nitrite salts, but, in the solution state, is actually hindered by the presence of nitrite ions.

What is claimed is:

1. A stabilized, crude alkali metal polystyrene sulfonate solid polymer composition having uniformly admixed therewith from about 0.5 up to about 30 percent by weight of a water-soluble nitrite based on the weight of the polymer.

2. A composition of matter as in claim 1 wherein the nitrite is an alkali metal nitrite.

3. In a method for preparing a crude alkali metal polystyrene sulfonate which comprises preparing a crude polymerizate of an alkali metal styrene sulfonate in water by simultaneous dehydrohalogenation of β-bromoethylbenzene sulfonate and polymerization of the resulting monomer, the improvement for stabilizing the crude alkali metal polystyrene sulfonate which consists of incorporating into the aqueous polymerizate from about 0.5 up to about 30 percent based on the weight of the polymer therein of a water-soluble nitrite and drying the nitrite treated polymerizate to recover a stabilized solid polymer composition.

4. A method as in claim 3 wherein the water-soluble nitrite is an alkali metal nitrite.

5. A method as in claim 3 wherein the water-soluble nitrite is sodium nitrite.

References Cited

UNITED STATES PATENTS

| 2,599,813 | 6/1952 | Crouch et al. | 260—79.3 |
| 2,879,257 | 3/1959 | Walter et al. | 260—45.9 |
| 3,065,193 | 11/1962 | Volk | 260—45.9 |
| 3,067,161 | 12/1962 | Roth | 260—79.3 |
| 3,218,301 | 11/1965 | Moody et al. | 260—79.3 |

DONALD E. CZAJA, *Primary Examiner.*

H. E. TAYLOR, *Assistant Examiner.*